Feb. 17, 1970

MASAHARU SUMIYOSHI ET AL 3,495,421

TORQUE TRANSMISSION DEVICE

Filed July 10, 1968

INVENTOR.

BY
Attorney

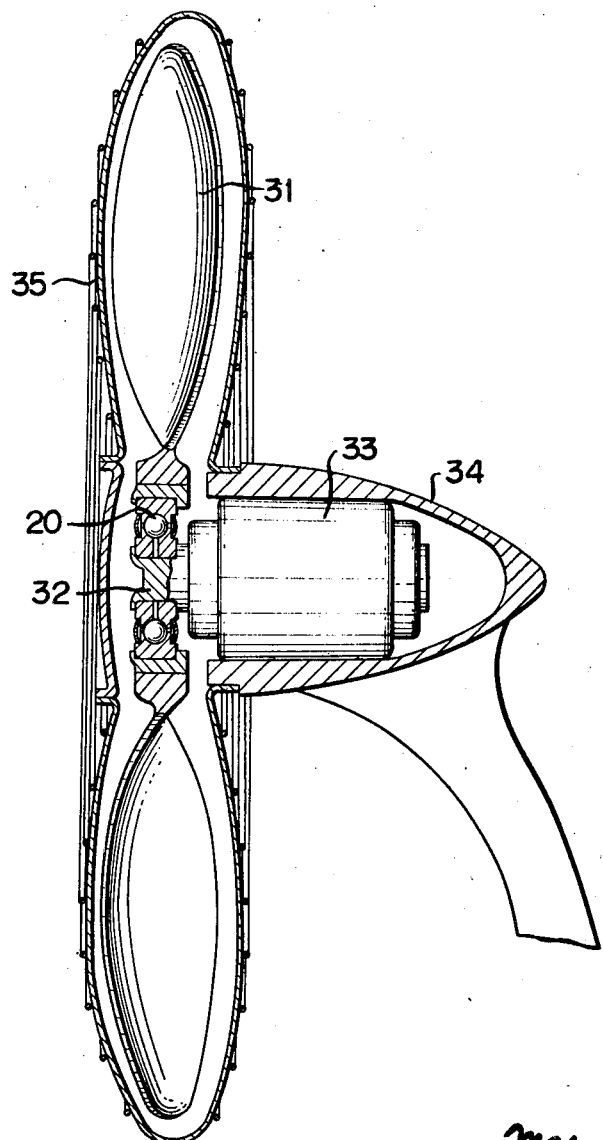

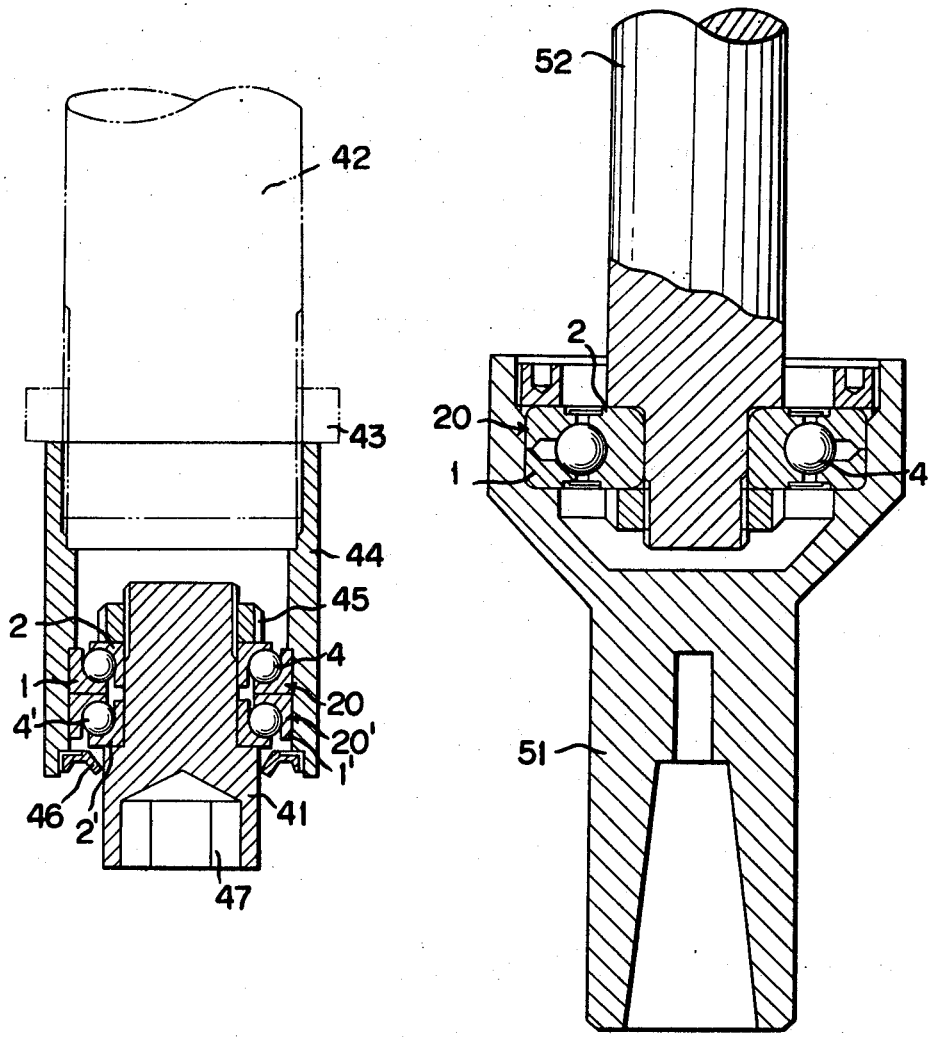

United States Patent Office 3,495,421
Patented Feb. 17, 1970

3,495,421
TORQUE TRANSMISSION DEVICE
Masaharu Sumiyoshi and Nobuo Fukuma, Toyota-shi, Yuji Mori, Aichi-ken, and Kunio Okui, Toyama-ken, Japan, assignors to Toyota Jidosha Kogyo Kabushiki Kaisha, Aichi-ken, Japan, a corporation of Japan
Filed July 10, 1968, Ser. No. 743,773
Claims priority, application Japan, July 12, 1967, 42/44,443
Int. Cl. F16d 7/02
U.S. Cl. 64—30               4 Claims

ABSTRACT OF THE DISCLOSURE

A torque transmission device, comprising in combination, inner and outer cylindrical races one of which serves as the drive side, the other as the driven side; bearing balls interposed between said races along the respective outer and inner peripheries thereof; grooves in said races for holding said balls, the radius of said balls being almost equal to the radius of curvature of said grooves at least on one side of said cylindrical races, the depth of said grooves being a little smaller than the depth of said balls, the long diameter of the ellipse formed by a point of contact on said ball with said groove being large so that the maximum torque being transmitted from the drive side to the driven side is limited to a fixed force and when this force is exceeded, the balls will turn causing slipping.

BACKGROUND OF THE INVENTION

The present invention relates to a torque transmission coupling which acts to limit the maximum torque transmitted from a drive side to a driven side to a fixed value, and, at the same time, which also functions as a bearing.

In revolving machines and apparatus which are used in various fields, there are times where there is a requirement that the machine and apparatus on the load side or the driven side on the one hand, or the drive side on the other hand is not subjected to an excessive torque for reasons of safety or to raise the quality of the work. The present invention provides a torque transmission apparatus for satisfying such a demand.

Generally speaking the present invention contemplates a driving mechanism wherein rotary drive is imparted by a plurality of rolling balls which are interposed between the inner and outer periphery, i.e., between an inner race and an outer race one of which acts as a drive side or driven side. The radius of the bearing balls are almost equal to the radius of curvature of a pass groove cross section in which the bearings roll, at least on one side of said inner race and outer race on which the balls roll. The depth of this pass groove is made a little smaller than the radius of said ball and are so constructed as to tend to enlarge the projected long diameter of the ellipse formed by the contact of said ball with the pass groove. The present invention utilizes the frictional force between the inner and outer races based on the composite action of a so-called differential slip or of the differential slip and a so-called slip by spin or spin slip.

BRIEF DESCRIPTION OF THE DRAWING

The present invention will be explained with reference to the drawing, in which;

FIGS. 4, 5, 6 and 7 are the respective longitudinal sectional views showing the different examples of the present invention.

DETAILED DESCRIPTION

Figure 1:
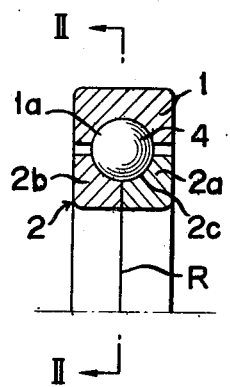
FIG. 1 is a longitudinal sectional view of an embodiment of the present application.
Figure 2:
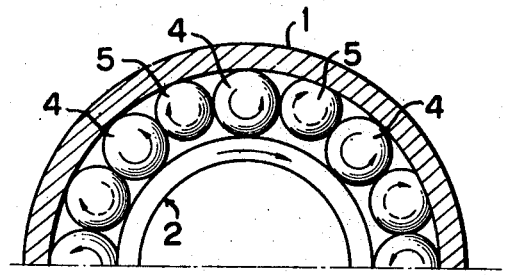
FIG. 2 is a cross sectional view taken along the line II—II of FIG. 1.

In FIGS. 1 and 2, numeral 1 indicates an outer race, 2 an inner race. The inner race 2 is divided into two sections which meets at right angles at a place R, with a revolving shaft not shown in the drawing. This inner race 2 is kept prestressed axially from both its end surfaces. Inserted between each groove 1a and 2c of the outer race 1 and the inner race 2 is a ball 4, and a plurality of the balls (8 pieces in this embodiment) are arranged around the periphery of the inner and outer races. The radius of curvature of the groove cross section at least on one side of the inner and outer races is made nearly equal to the radius of the ball 4 so that this ball 4 may make contact with each groove 1a or 2c of the inner and outer races in the whole area of width. Arranged between each ball 4 is an auxiliary ball 5. In order to maintain the peripheral interval of ball 4, the diameter of ball 5 is a little smaller than that of the ball 4 (as exaggeratedly indicated in the drawing). Thus, damage by a violent relative friction between balls 4 is avoided. When the ball 4 and the auxiliary ball 5 are to be alternately arranged without clearance, it is advisable to determine the size of each ball to such a degree as to have some clearance at the end of the pitch circumference, for instance, a clearance of about the length of the radius of the ball. The ball 4 is prestressed through the inner race 2 and the outer race 1. Since the auxiliary ball 5 is a little smaller in diameter than the ball 4, a load is not imposed on the ball 5, which is in contact with either the inner race or the outer race. FIG. 2 shows the case where the auxiliary ball 5 is in contact with the outer race 1. And in the groove between the inner race and the outer race, lubrication takes place with oil, grease, etc. like the well-known ball bearing.

The friction of the conventional ball bearing is very small and this race has been used by the reason of this special feature but the apparatus of the present invention has, on the contrary, the construction wherein because of the construction of the elements, friction by differential slip or by spin movement becomes extremely large, and by the utilization of this frictional torque a maximum torque which can be transmitted to the driven side is limited to a fixed value. Thus, the arrangement herein described may be used as a torque transmission coupling i.e., a coupling wherein a frictional force against the rolling of the ball is made large by enlarging the long diameter of the ellipse formed by the contact of the ball with the inner and outer races as mentioned above.

Figure 3:
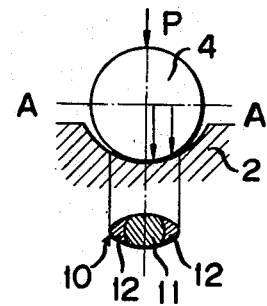
FIG. 3 is a schematic diagram illustrating the principle of the present invention.

The principle of the present invention will be explained with reference to FIG. 3. When the ball 4 subjected to a load P rolls on the axis A—A as the rotating axis, the distance $r$ from the rotating axis A—A to the path of travel of the ball, i.e., to the ellipse formed by the contact of the ball 4 with the inner race 2 (illustrated in FIG. 3), varies, according to the position of the axial direction and therefore because of the configuration of contact ellipse 10, the surface of the ball 4 slips contrary to the direction of advance of the ball at the central portion 11 of the ellipse in the direction of the long diameter and also the surface of the ball 4 slips in the direction of advance of the ball at the both ends portion 12 of the ellipse. Thus, a so-called differential slip occurs, so that in the rolling of ball 4, a frictional resistance occurs between the ball and the inner race or the outer race. This frictional resistance becomes large in proportion to the load P and the variation in the direction of the long diameter of said contact ellipse, against the distance $r$ from the rotating axis of the ball to the inner race or the outer race. In other words the length of the long diameter of said contact ellipse.

In the apparatus of the present invention, in the case of the load imposed when the rotating axis of the ball runs parallel to the axis of the apparatus, only a frictional torque occurs which is caused by said differential slip, but when not parallel, a friction caused by a spin movement of the ball is added besides said differential slip and frictional torque is increased.

For the purpose of giving those skilled in the art a better understanding of the invention, practical embodiments are shown in FIGS. 4 to 7.

PREFERRED EMBODIMENTS

Figure 4:
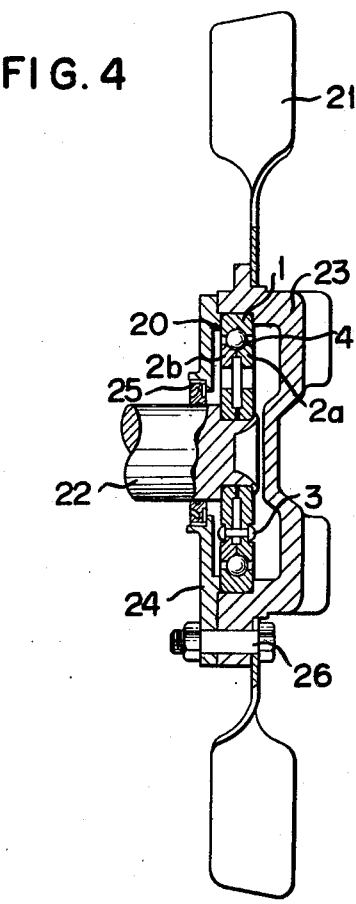

In FIG. 4, the apparatus of the present invention is applied to the cooling fan which is used in the internal combustion engine of a motorcar having a torque transmission coupling 20 relating to the present invention shown in FIGS. 1 and 2 and also serves as a bearing. There is a fan blade 21 fixed to the outer race side of the coupling 20, and a fan drive shaft 22 fixed to the inner race. In this case, up to a fixed speed of rotation, the drive shaft 22 and the blade 21 are rotated integrally through the coupling 20, but in a case of exceeding the fixed speed of rotation, a slip occurs in the coupling 20 and an excessive rotation of the fan blade 21 is prevented. Thus, on the fan drive shaft 22 which rotates at the speed equal or proportional to that of the engine, are fixed inner race sections 2a, 2b by calking the end of the shaft 22. The inner race section 2a, 2b, each have a channel-shaped cross-section and have been previously fastened together by means of rivets 3 in order to produce a desired torque to be transmitted. The race sections 2a, 2b act like disc springs and serve to compensate for tolerances in fastening or deformation during the operation of the device. A housing 23, which is fitted on the outer race 1 of the torque transmission 20 carries a fan blade 21 mounted thereto by means of bolts 26. The housing 23 is covered at its open side with a cover member 24 which is passed through at its center bore by drive shaft 22. The gap between the inner edge of the cover member 24 and the shaft 22 is provided with an oil seal member 25 for keeping the lubricating oil within the housing 23 from flowing out.

The torque of the fan drive shaft 22 is transmitted from the inner race sections 2a, 2b through balls 4 to the outer race 1 of the coupling 20, and causes the fan blade 21 to rotate. With increase of the speed of the drive shaft 22, the torque necessary for driving the fan blade 21 also increases. However, since the torque transmitted by the coupling 20 is fixed to the predetermined value, the speed of the fan blade 21 does not exceed that predetermined value corresponding to the fixed torque. In other words, up to a predetermined speed the drive shaft 22 and the fan blade 21 are rotated integrally through the coupling 20. When the torque necessary for driving the fan blade 21 exceeds the set value of the transmission torque in the coupling 20, the speed of the fan 21 does not increase with the increase of the rotational speed of drive shaft 22 because the inner race sections 2a, 2b are now rotated relatively with regard to the outer race 1 with the balls 4 rolling between the races 1 and 2a, 2b. Even then, the set torque, owing to the differential slip hereinbefore described and the rolling resistance in the coupling 20 is still transmitted to fan blade 21.

In FIG. 5, the apparatus of the present invention is applied to an electric fan having a torque transmission coupling 20 which also serves as a bearing, an electric fan blade 31, a drive shaft 32, a driving electric motor 33, a housing case 34. In this instance, when bars, etc. are inserted from the space of a guard net 35 by error, the coupling 20 acts in such a way that a burning damage of the electric motor 33 by an excessive load may be prevented. Thus, when the blade 31 is subjected to an excessive torque, the coupling 20 slips over the torque transmission limit of the coupling 20 and therefore, in spite of the rotation of the shaft 32 the blade 31 is stopped and damage is prevented.

FIG. 6 shows an example in which the apparatus of the present invention is applied to a nut driver. There is a coupling 20 relating to the present invention, an inner race 2 is fixed to a nut holder 41, an outer race 1 is axially moved from the inner race 2 and fixed to a drive shaft 42. In this case, since the rotating axis is not in parallel with the axis of the coupling 20, a friction by spin movement is added besides the friction by the differential slip. The force of rotation is transmitted to the nut carrier 41 through the coupling 20 by means of the rotation of the drive shaft 42. When a nut, not shown in the drawing, is tightened and, the nut reaches a fixed tightened position, a slip occurs between the inner race 2 and the outer race 1 in the coupling 20. Excessive tightening up of the nut does not take place so that the tightening takes place only sufficiently.

Thus, although in the embodiment of FIG. 6, the pair of couplings 20 and 20' are arranged coaxially, the rotating axes of the balls 4 are not in parallel with the axis of the coupling 20 or 20'.

At the end of the drive shaft 42 of the nut driver there is a hollow-cylindrical intermediate shaft 44 by means of a ring nut 43. The couplings 20 and 20' in axial back to back arrangement are fitted with their outer races 1 and 1' in the free end of the intermediate shaft 44, while the inner races 2 and 2' are fastened onto the end of a nut holder 41 having a hexagonal recess 47 for holding a nut to be tightened by means of a nut 45. An oil seal member 46 keeps the lubricating oil which is within the space between the intermediate shaft 44 and the nut holder 41 from flowing out.

In FIG. 7, the coupling of the present invention is employed between a socket arbor such as a drill or reamer and a drive shaft, the socket arbor 51 is fitted to the outer race 1 of the coupling 20, the drive shaft 52 drives the inner race 2 under ordinary conditions, and a force of rotation is transmitted from the drive shaft 52 to the socket arbor 51 through the coupling 20. When an unusual load is imposed on the socket arbor 51, the coupling 20 runs idle and breakage or damage is prevented.

The coupling relating to the present invention serves as the torque transmission mechanism by creating a frictional torque and besides in the case of excess torque over the fixed torque, the inner race and the outer race slip and trouble or inconvenience due to excessive torque is prevented and further, the coupling also serves as a conventional ball bearing arrangement. Moreover, this coupling can be made cheaply in a small size with a simple construction. In order to obtain a frictional force between the inner race and the outer race, the resilient force of each component parts is used. The drive is possible without a particular pressing apparatus. Furthermore, since the slip arises by the differential slip and the spin movement of the ball, slipping speed is small and durability is excellent as compared with a general frictional apparatus.

Although the present invention has been described in conjunction with preferred embodiments, it is to be understood that modifications and variations may be resorted to without departing from the spirit and scope of the invention, as those skilled in the art will readily understand.

We claim:

1. A torque transmission device, comprising in combination, inner and outer cylindrical races one of which serves as the drive side, the other as the driven side; bearing balls interposed between said races along the respective outer and inner peripheries thereof; grooves in said races for holding said balls, the radius of said balls being almost equal to the radius of curvature of said grooves at least on one side of said cylindrical races, the depth of said grooves being a little smaller than the depth of said balls, the long diameter of the ellipse formed by a point of contact on said ball with said groove being large so that the maximum torque being transmitted from the drive side to the driven side is limited to a fixed force and when this force is exceeded, the balls will turn causing slippage and, auxiliary balls interposed between said bearing balls, the diameter of said auxiliary balls being slightly smaller than the diameter of the bearing balls so that said auxiliary balls extend between races but a load is not imposed thereon.

2. A torque transmission device as claimed in claim 1 used for driving a cooling fan including a fan drive shaft fixed to the outer race and a fan blade rotated by said drive shaft.

3. A torque transmission device as claimed in claim 1 for driving a nut including a drive shaft fixed to said outer race and a nut holder fixed to said inner race.

4. A torque transmission device as claimed in claim 1 including a socket arbor 51 fixed to the outer race and a drive shaft fixed to said inner race.

References Cited

UNITED STATES PATENTS

| | | | |
|---|---|---|---|
| 1,612,954 | 1/1927 | Trbojevich | 64—30 X |
| 2,132,928 | 10/1938 | Blanchard | 64—30 |
| 2,974,504 | 3/1961 | Johnson | 64—30 |
| 3,233,429 | 2/1966 | Kohen et al. | 64—30 X |

JAMES A. WONG, Primary Examiner